US005887693A

United States Patent [19]

Hsu

[11] Patent Number: 5,887,693

[45] Date of Patent: Mar. 30, 1999

[54] ADJUSTING DEVICE FOR CONTROLLING SWITCH

[76] Inventor: Mu-Chuan Hsu, No. 26, Lane 242, Sec. 3, Chung Cheng Rd., Jen Te Hsiang, Tainan Hsien, Taiwan

[21] Appl. No.: 914,109

[22] Filed: Aug. 19, 1997

[51] Int. Cl.[6] .............................. F16D 11/04; E06B 9/30; E06B 9/26

[52] U.S. Cl. ....................... 192/139; 160/168.1; 160/175; 160/178.1

[58] Field of Search ................................ 160/175, 178.1, 160/168.1, 168.1 P; 192/139, 142 R; 242/375

[56] References Cited

U.S. PATENT DOCUMENTS

| | | | |
|---|---|---|---|
| 2,801,814 | 8/1957 | Fischer et al. | 160/168.1 X |
| 4,200,135 | 4/1980 | Hennequin | 160/168 |
| 4,644,990 | 2/1987 | Webb, Sr. et al. | 160/178 C X |
| 5,038,843 | 8/1991 | Sommerfeld | 160/168.1 X |
| 5,279,473 | 1/1994 | Rozon | 160/178.1 X |
| 5,390,721 | 2/1995 | Oskam et al. | 160/168.1 |
| 5,626,177 | 5/1997 | Colson et al. | 160/168.1 |

*Primary Examiner*—Charles A. Marmor
*Assistant Examiner*—Roger Pang
*Attorney, Agent, or Firm*—Varndell Legal Group

[57] ABSTRACT

The present invention is an adjusting mechanism for a controlling switch which comprises a transmission mechanism. The gear of the transmission mechanism is meshed with a driving gear and a worm is driven via an inner gear. The worm is further meshed with a driven gear of the adjusting mechanism. The driven gear is provided with clutching plates at both sides. A stopping block biased by a resilient spring plate is disposed adjacent to the clutching plate such that the clutching plate is pressed against the driven gear and is rotated together with the driven gear. The clutching plate is provided with a coil spring externally and centrally. The resilient spring plate is further provided with a triggering rod such that the clutching plate can be removed from the driven gear. On the other hand, the clutching plate can be also moved back to its original position by the coil spring such that the stopping block will press onto a rocker arm and the switch will be triggered off. The stopping block can be readily adjusted such that the driving mechanism can be readily triggered off in both clockwise and counterclockwise rotations.

1 Claim, 3 Drawing Sheets

ADJUSTING DEVICE FOR CONTROLLING SWITCH

BACKGROUND OF THE INVENTION

The present invention relates to an adjusting device, more particularly, to an adjusting device for controlling switch which generally comprises a transmission mechanism and an adjusting mechanism. The gear of the transmission mechanism is meshed with a driving gear and a worm is driven via an inner gear. The worm is further meshed with a driven gear of the adjusting mechanism. The driven gear is provided with clutching plates at both sides. A stopping block biased by a resilient spring plate is disposed adjacent to the clutching plate such that the clutching plate is pressed against the driven gear and is rotated together with the driven gear. The clutching plate is provided with a coil spring externally and centrally. The resilient spring plate is further provided with a triggering rod such that the clutching plate can be removed from the driven gear. On the other hand, the clutching plate can be also moved back to its original position by the coil spring such that the stopping block will press onto a rocker arm and the switch will be triggered off. The stopping block can be readily adjusted such that the driving mechanism can be readily triggered off in both clockwise and counterclockwise rotation.

DESCRIPTION OF PRIOR ART

The curtain and blinds used at both movie theaters and home are operated manually via the lift cord. On the other hand, a simple motor is also applied to conduct the lifting or lowering of the curtain or blinds. However, in the existing controlling mechanism, the height of the curtain or blinds are difficult to control and a great inconvenience will be encountered by the user.

SUMMARY OF THE INVENTION

It is the objective of this invention to provide an adjusting device for a controlling switch. The driven gear of the transmission mechanism is moved by the driving gear. A worm is used to move the adjusting mechanism. A triggering rod is used to separate the resilient spring plate from the clutching plate. A coil spring is used to return the clutching plate and the limit switch can be triggered to switch off the power source. The driving gear is rotated along in the opposite direction and the procedures are repeated as described above. The triggering rod is moved in another direction and the clutching plate on the other side is returned to its original position. A stopping position is also set. The driving gear can be stopped at suitable positions in both clockwise and counterclockwise directions.

DETAILED DESCRIPTION OF THE PREFERRED EMBODIMENTS

Figure 1:
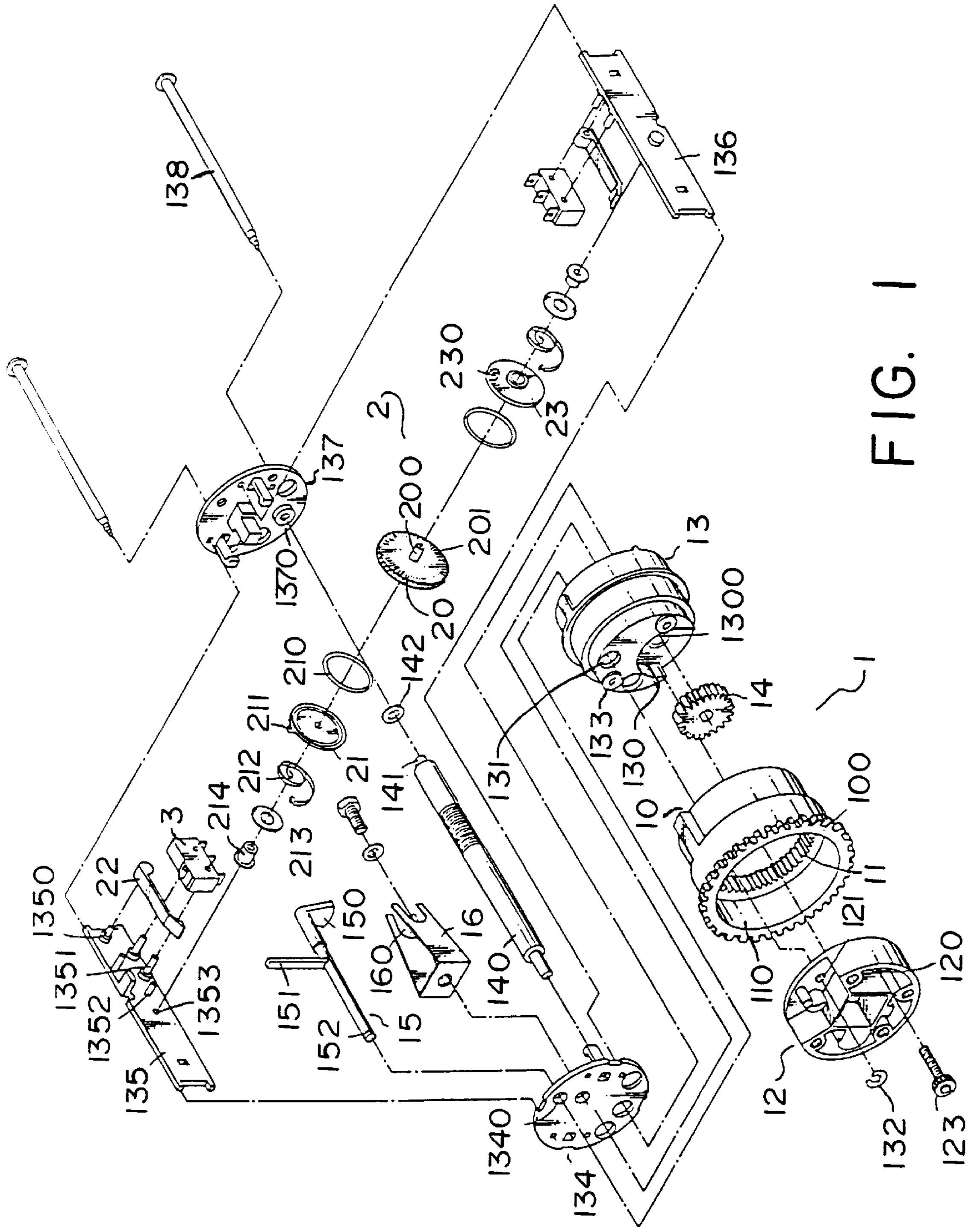
FIG. 1 is an exploded view of the present invention.
Figure 2:
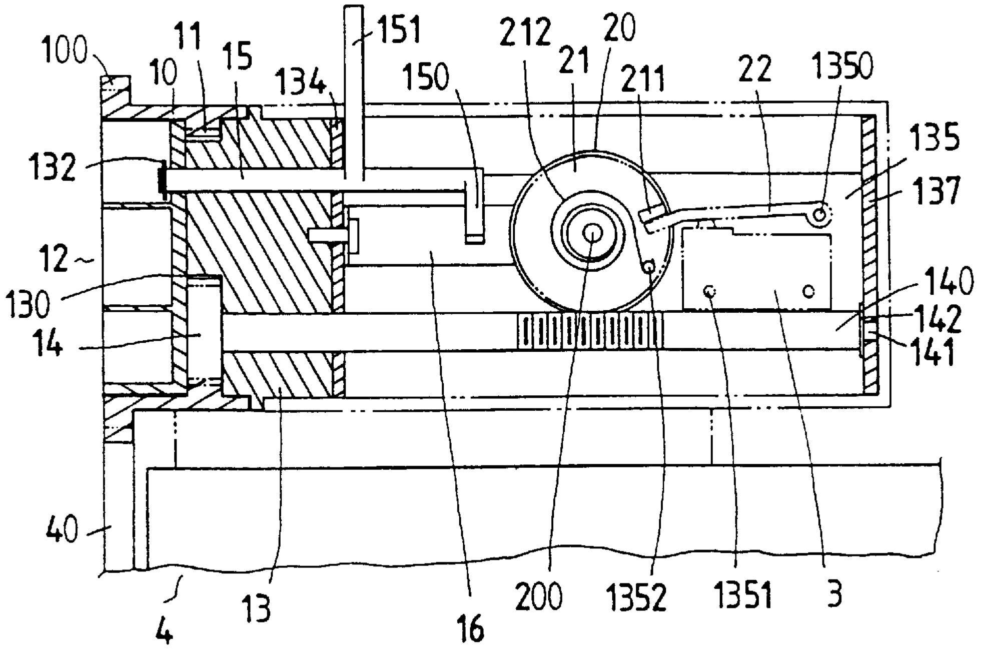
FIG. 2 is a cross sectional view of the present invention.
Figure 3:
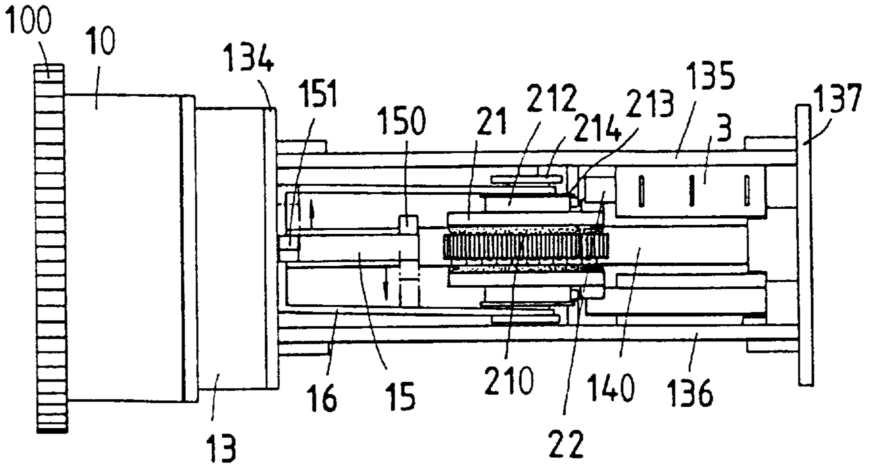
FIG. 3 is a schematic illustration showing the operational movement (1) of the present invention.
Figure 4:
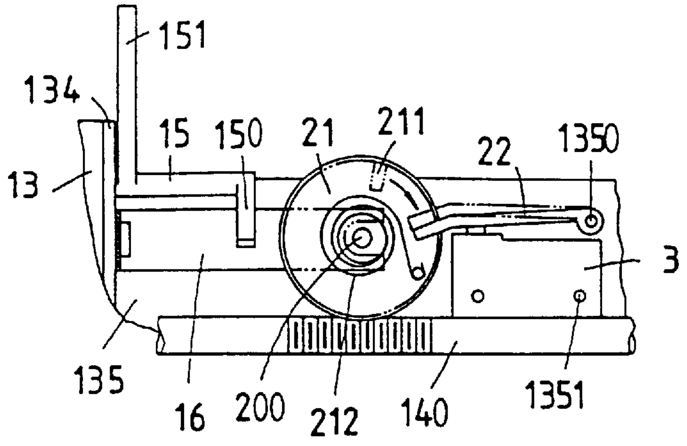
FIG. 4 is a schematic illustration showing the operational movement (2) of the present invention.
Figure 5:
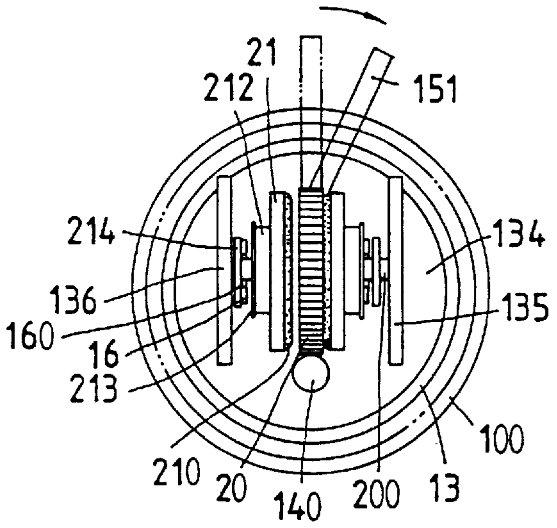
FIG. 5 is a schematic illustration showing the operational movement (3) of the present invention.

Referring to FIGS. 1 and 2, the adjusting device made according to the present invention generally comprises a transmission mechanism 1 and a housing 13 provided with a hole 1300. The cutout 130 is rotationally mounted with a gear 14 which is connected with a worm 140 via the hole 1300. The housing 13 is further provided with a hole 131 for disposing a triggering rod 15 thereof. A front portion of the housing 13 is further enveloped with a gear 10 having a teeth portion 100 externally. A hole 110 is disposed with an inner gear 11 which is meshed with the gear 14 of the housing 13. The gear 14 is connected with a worm 140 and the end portion 141 of the worm 140 is disposed within a shaft hole 1370 of a fixing socket 137 via a lining 142. A cover 12 is disposed within the hole 110 of the gear 10. A locking screw 123 is inserted from a hole 120 and finally locked into a threaded hole 133 of the housing 13. The housing 13 is provided with a fixing socket 134 and a pair of side plates 135 and 136 are connected externally. The side plates 135 is provided with shaft sockets 1350 and 1351 and a shaft hole 1353. The other side plate 136 is further provided with complementary elements in the corresponding positions. The end portions of the side plates 135 and 136 are further connected with a fixing socket 137. A locking screw 138 is applied to pass through the hole 1370 to attach the fixing sockets 134 and 137 onto the housing 13.

The adjusting mechanism 2 includes a driven gear 20 which is meshed with the worm 140. The driven gear has coarse surfaces 201 at both sides. Each side of the coarse surfaces 201 is provided with a clutching plate 21. The gear 20 is provided with a shaft 200. The clutching plate 21 is provided with a frictional rib 210 at inner side. A stopping block 211 is disposed at outer side. A coil spring 212 is disposed at the shaft 200. The coil spring 212 is fixedly attached to the clutching plate 21 at one end and the other end of the coil spring 212 is anchored on a mounting post 1352 of the side plate 135. The coil spring 212 is further provided with a lining 213 and a barrel 214. The shaft 200 of the gear 20 is rotationally inserted into the shaft hole 1353 of the side plate 135. This is same to the other side. The fixing socket 134 is provided with a resilient pressing plate 16 having a cutout 160 thereof. The cutout 160 can be enveloped onto the outer peripheral of the barrel 214 of the clutching plate 21. The triggering rod 15 is inserted into the hole 1340 of the fixing socket 134 and the hole 121 of the cover 12. A C-type clip 153 is clipped into the clipping slot 152. The triggering rod 15 is provided with a handle 151 and triggering plate 150 is disposed at end portion of the triggering rod 15 and which can be disposed between the resilient pressing plate 16. The shaft socket 1351 of the side plate 135 is provided with a limit switch 3. The other shaft socket 1350 is provided with a rocker arm 22. The other side plate 136 is also provided with the identical components which are located in the reverse position.

By the assembling of those described components, the adjusting device of controlling switch is attained.

Referring to FIGS. 2, 3, 4 and 5, the adjustment is mainly performed by the driving gear 40 of the driving mechanism 4. The gear 100 of the gear set 10 is driven by the gear 40 of the driving mechanism 4. Then the gear 14 which connected with the worm 140 is driven by the inner gear 11. Then the gear 20 is rotated by the worm 140. The clutch plate 21 is contacted with the gear 20 by the biasing force exerted from the resilient pressing plate 16. Accordingly, the clutching plate 21 is rotated simultaneously with the gear 20. When the number of rotations of the driving mechanism 4 reaches the preset number, the handle 151 of the triggering rod 15 can be pulled aside such that the resilient pressing plate 16 is removed and the clutching plate 21 is separated from the gear 20. By the application of the coil spring 212, the clutching plate 21 will resume to its original position. As a result, the stopping block 211 disposed outward of the clutching plate 21 may press down the rocker arm 22. Once the limit switch 3 is triggered, the power supply to the driving mechanism 4 can be stopped. It is same in the reverse direction. The stopping blocks 211 and 230 of the clutching plates 21 and 23 can be readily set to control the interrupt of power supply of the driving mechanism 4. By this arrangement, the driving mechanism can be readily stopped at time.

While particular embodiment of the present invention has been illustrated and described, it would be obvious to those skilled in the art that various other changes and modifications can be made without departing from the spirit and scope of the invention. It is therefore intended to cover in the appended claim all such changes and modifications that are within the scope of the present invention.

What I claim is:

1. An adjusting device for a controlling switch, comprising;

a transmission mechanism having a housing which has a cutout therein, a hole within said cutout, a housing gear mounted within said cutout which is connected with a worm via said hole, said housing having a second hole in which a triggering rod is disposed, a front portion of said housing supporting a second gear having an external toothed portion and an internal toothed portion, said internal toothed portion is meshed with said housing gear, an end portion of said worm disposed within a shaft hole of a fixing socket via a lining, a cover disposed within said second gear, a locking screw inserted through said cover and locked into a threaded hole of said housing, said housing having a second fixing socket and a pair of side plates having end portions connected externally to said second fixing socket, said side plates having complementary shaft sockets and shaft holes respectively, a second locking screw attaching said fixing sockets onto said housing; and an adjusting mechanism including a driven gear which is meshed with said worm, said driven gear provided with a coarse surface on both sides, each of said coarse surface engaging a clutching plate provided on a clutch shaft, said clutching plates each provided with a stopping block thereon, a frictional rib at an inner side thereof, and at an outer side, a pair of coil springs, one coil spring having one of its ends fixedly attached to one clutching plate, and the other coil spring is fixedly attached to the other clutching plate, each coil spring having its other end anchored on a mounting post of one of said side plates, each coil spring provided with a lining and a barrel, said second fixing socket provided with a resilient pressing plate with arms having cutouts therein, said pressing plate cutouts enveloped onto the outer peripheral of said barrels of said coil springs, said triggering rod inserted through a hole in said second fixing socket and a hole in said cover, a C-type clip clipped into a clipping slot on said triggering rod, said triggering rod provided with a handle, a triggering plate disposed at one end portion of said triggering rod and which can be disposed between said arms of said resilient pressing plate, one of said shaft sockets of said side plates provided with a limit switch, the other of said shaft sockets provided with a rocker arm, wherein by setting the position of said stopping block of said clutching plates, said driving mechanism can be readily controlled and stopped at a desired position in both clockwise and counterclockwise directions.

* * * * *